United States Patent [19]

Ferman et al.

[11] Patent Number: 4,817,984
[45] Date of Patent: Apr. 4, 1989

[54] VEHICLE SUSPENSION SYSTEM

[75] Inventors: Michael Ferman, Sydney; Craig Dale, Greenacre, both of Australia

[73] Assignee: Arindol Pty. Limited, Bondi Junction, Australia

[21] Appl. No.: 92,169

[22] Filed: Sep. 2, 1987

[51] Int. Cl.⁴ .............................................. B62D 17/00
[52] U.S. Cl. ..................... 280/668; 280/661
[58] Field of Search ............... 280/661, 688, 690, 275, 280/698, 668

[56] References Cited

U.S. PATENT DOCUMENTS

| | | | |
|---|---|---|---|
| 4,213,631 | 7/1980 | Wilkerson | 280/661 |
| 4,372,575 | 2/1983 | Hyma | 280/661 |
| 4,690,425 | 9/1987 | Kubo | 28/668 |

Primary Examiner—Richard A. Bertsch
Attorney, Agent, or Firm—Dellett, Smith-Hill & Bedell

[57] ABSTRACT

A vehicle has mounted inside the upper end of a suspension tower of its wheel suspension system, a support assembly for holding the upper end of a macpherson strut. The assembly has an inner bearing (32) supported in a resilient rubber bush (18). The axis of the bearing is arranged eccentrically to the center of one, or preferably two pairs of overlapping rings (21,22 and 33,100). Each pair of rings can be clamped against rotation, or freed to allow one of the rings to be rotated with respect to the other. Rotation of the unclamped ring produces a repositioning of the upper end of the strut so that its misalignment in camber and castor can be corrected. The two rings can then be re-clamped together.

9 Claims, 5 Drawing Sheets

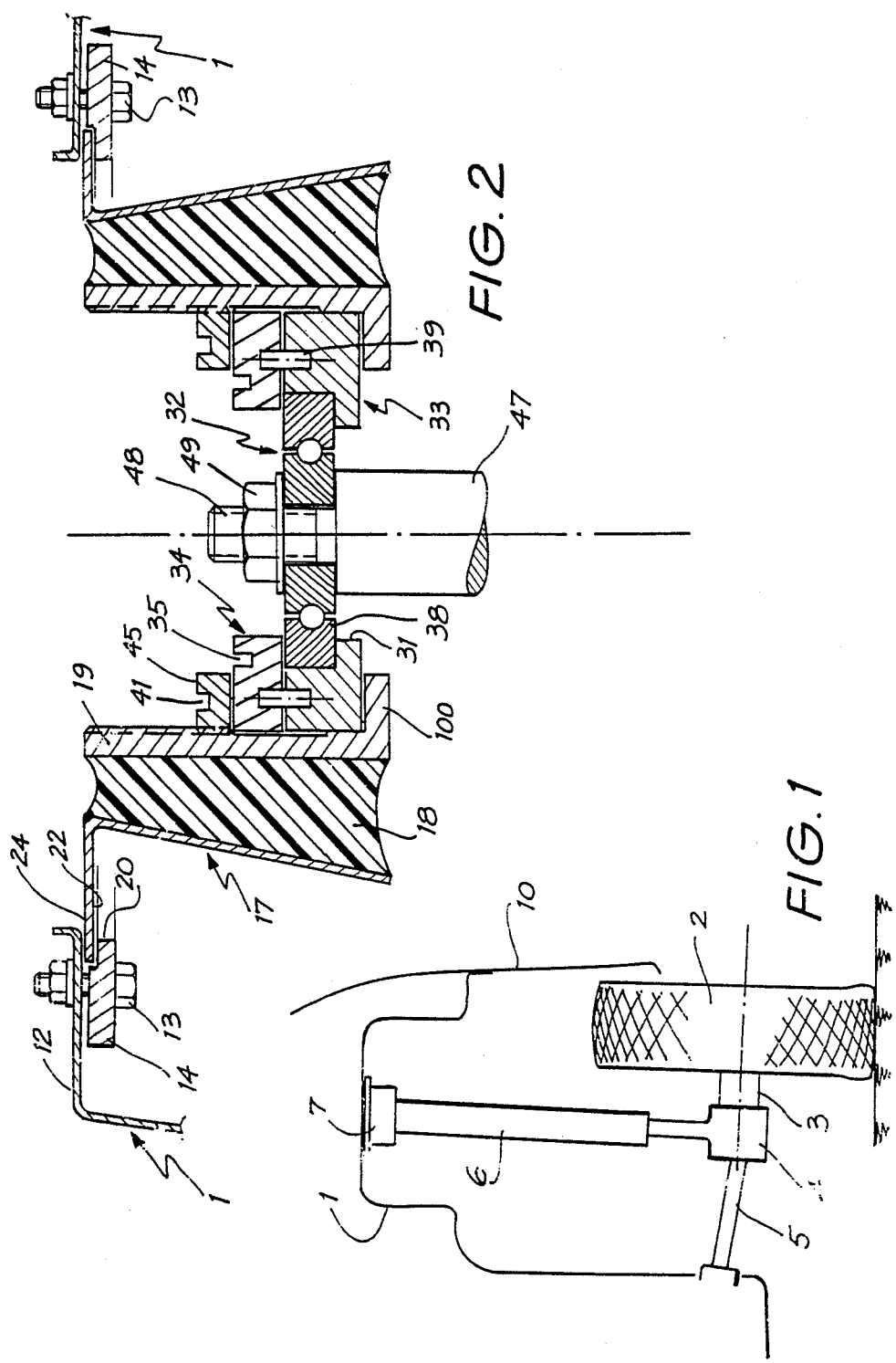

4,817,984

VEHICLE SUSPENSION SYSTEM

FIELD OF THE INVENTION

This invention relates to a wheel suspension system for a vehicle and is more specifically concerned with supporting the upper end of an upright strut, usually a MacPherson strut, through which part of the weight of the vehicle is transmitted to one of its front wheels.

STATE OF THE ART

Normally the upper end of a MacPherson strut is supported by a thrust-bearing support assembly. This comprises a bearing engaged by the top of the strut and supported in an annular, resiliently deformable bush made of rubber. The outside of the bush is bonded to a mounting plate which is bolted to the underside of a suspension tower built into the upper part of a wheel arch of the vehicle. The bearing allows the strut to turn about its vertical axis when the front wheel is turned, and the rubber bush accommodates axial vibration and tilting of the strut which occurs when the vehicle is travelling over rough ground.

It is important that the the strut remains at its designed angle so that the wheel is held at the correct angle. However, wear of mechanical parts of the wheel-suspension system can cause the position of the lower end of the strut to change with respect to its upper end. The strut is then no longer correctly positioned. If the strut lower end is displaced by wear inwardly or outwardly, it is known as camber change, and if the displacement is rearwardly or forwardly it is known as castor change. In both cases there is a change in the pressure pattern of the wheel's tread with the surface of the road. The resultant increased wear on one side of the tire with respect to the other is often the first indication the average driver has that there may be a suspension misalignment problem. If such a problem is left unattended, the road-handling characteristics of the vehicle will deteriorate and, in an extreme case the vehicle can be prenounced unfit to drive.

One way of correcting misalignment caused by inclination of the the MacPherson strut, is to re-locate its upper end. In some cars this is done by bodily moving the thrust-bearing support assembly to bring the strut into vertical alignment. In modern vehicles provision is sometimes made in the thrust-bearing support assembly for accommodating some variation in the position of the upper end of the MacPherson strut. This is achieved by providing a mounting ring of the assembly with three bolt holes spaced equiangularly from one another around a circle. The thrust-bearing is arranged eccentrically with respect to the centre of the circle. It is possible with this arrangement to re-position the upper end of the MacPherson strut by unbolting the mounting plate, turning it through 120°, and then re-bolting it in position. This allows a limited amount of correction to be applied to the upper end of the strut. If more correction is necessary, it can be achieved by filing the bolt holes into slots elongated in the direction it is required to move the bearing. However this has the disadvantage that the contact areas between the heads of the bolts securing the thrust-support assembly in position, and the mounting ring, are reduced to a value beneath the designed value. Also, the physical strength of the mounting plate itself is weakened by the filing out of the bolt holes.

OBJECT OF THE INVENTION

An object of the invention is to provide a thrust-support assembly able to accommodate a wide range of repositioning of the upper end of a MacPherson strut without having to be physically weakened in the process.

THE INVENTION

In accordance with the present invention a thrust-support assembly for mounting the upper end of Mac-Pherson or similar strut, comprises a thrust-bearing for fitting to the upper end of the strut; an inner rigid annular member supporting the thrust bearing; an outer rigid annular member spaced radially outwardly of the inner member and having means for mounting the assembly in a suspension tower of a vehicle; a resiliently-deformable annular bush having shock-absorbing properties and located between the inner and outer rigid members; a first pair of inter-engaging circular, surfaces arranged eccentrically with respect to the thrust-bearing axis and lying between the inner and outer members; and, first clamping means tightenable to prevent relative movement between the two surfaces, and loosenable to allow the two surfaces to be rotated with respect to one another so as to bring the thrust-bearing to a new position with respect to the outer rigid member.

ADVANTAGES OF THE INVENTION

The assembly of the invention has the advantage that it allows repositioning of the upper end of a MacPherson strut over a wider range of positions than has hitherto been possible, without having to unbolt and then reposition the assembly, and without having to weaken it structurally. Such re-positioning is achieved simply by loosening the clamping means, turning the circular surfaces with respect to one another, to re-locate the thrust-bearing and then re-tightening the clamping means.

PREFERRED FEATURES OF THE INVENTION

Preferably the thrust-bearing support assembly is provided with two radially-spaced sets of circular support surfaces through which thrusts are transmitted between the inner and outer rigid members. Each of these sets is independently movable and has its own clamping means, and both sets of circular support surfaces are arranged eccentrically with respect to the thrust-bearing. One of the sets can then be used to adjust the MacPherson strut's position to correct for camber adjustment of the wheel and the other set can then be used to correct any caster misalignment produced by movement of the first set.

Conveniently one of the sets is provided outside the bush and the other inside the bush. The practical advantage of such an arrangement is that access to the individual sets is easier than when both are arranged outside the bush which is a theoretically possible alternative configuration.

It is not essential to provide the thrust-bearing support assembly with two sets of inter-engaging circular surfaces. In one arrangement a single set is used, one of the circular surfaces being formed on the assembly mounting plate and the other on a metal flange extending circumferentially around the bush.

In an alternative arrangement the thrust bearing is arranged eccentrically in the bush. A circular flange eccentrically surrounding the bush, has one circular surface formed by its outer marginal edge. The complementary circular surface is formed by a stepped inside rim of the mounting plate which conveniently provides a clamping ring. Suitably the clamping means are provided by bolts used to anchor the clamping ring in position. Loosening of these bolts allows the two circular surfaces to be relatively rotated.

Suitably the circular surface formed by a flange on a bush-holder which projects slightly above the clamping ring. When the bolts are tightened, the clamping ring locks the outer marginal edge of the flange between itself and the underside of the suspension tower so that rotational movement between the inter-engaging circular surfaces is prevented.

INTRODUCTION TO THE DRAWINGS

The invention will now be described in more detail, by way of examples, with reference to the accompanying, partly-diagrammatic drawings, in which:

IN THE DRAWINGS

FIG. 1 is a diagrammatic vertical section through a front wheel arch of a motor vehicle.

FIG. 2 is a vertical section through a thrust bearing support assembly mounted in the underside of the upper end of a suspension tower in the wheel arch.

Figure 3:
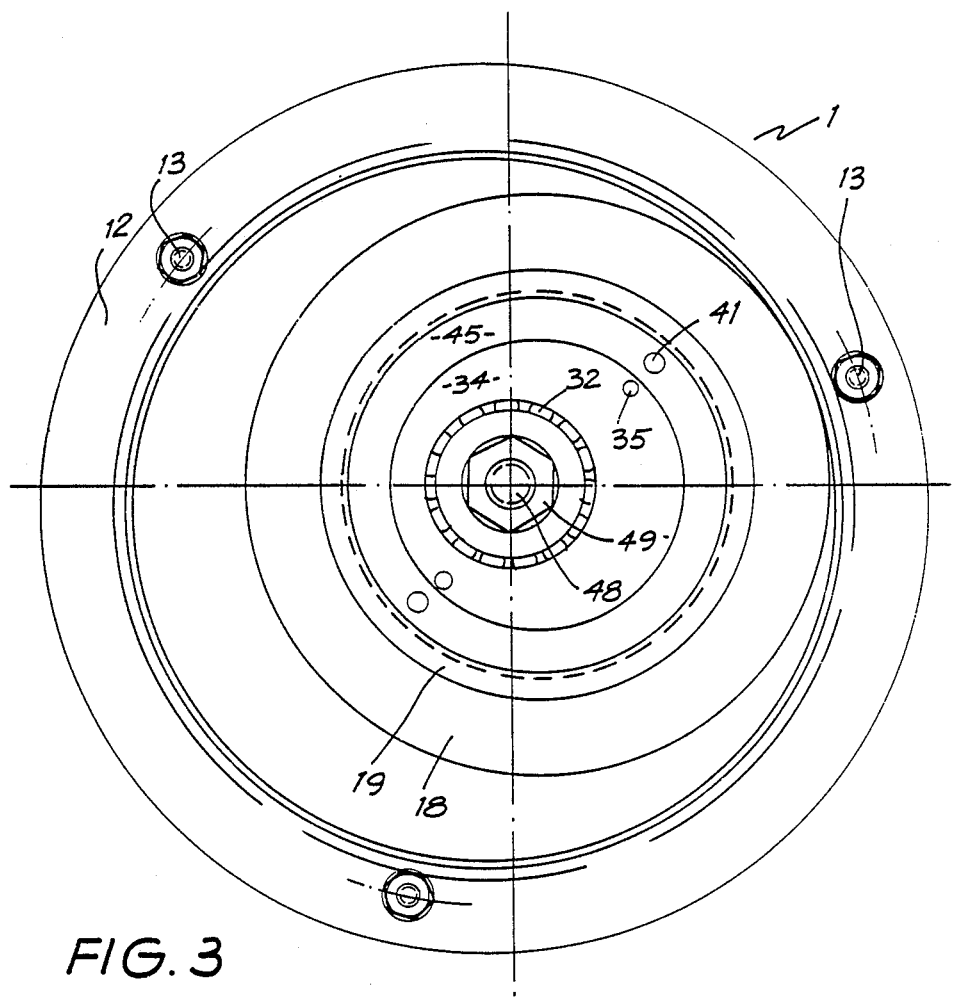
FIG. 3 is a plan view of FIG. 2.

FIG. 1 shows a motor vehicle wheel arch 10 having a suspension tower 1 at its upper end. A road wheel 2 is located in the wheel arch and has a stub shaft 3 extending to a joint 4. A radius link 5 defines the permissible horizontal path of movement of the joint 4. The vertical movement of the joint 4 is controlled by an upright MacPherson strut 6 having its lower end mounted on the joint 4 and its upper end located in a thrust-bearing support assembly 7 mounted in the underside of the suspension tower 1. This method of mounting a front wheel of a motor car is, of course, well known in the art.

DESCRIPTION OF FIRST EMBODIMENT

Figure 4:
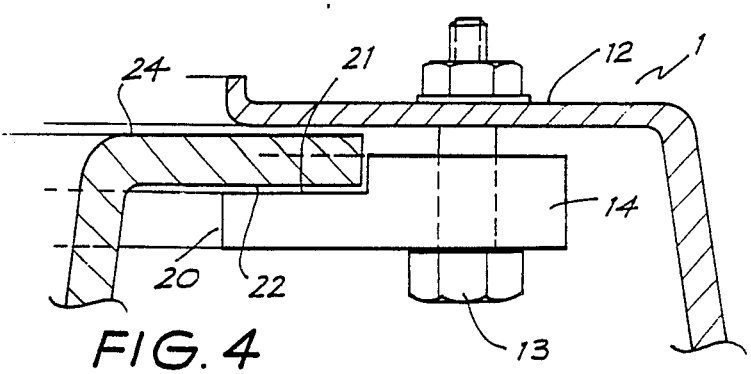
FIG. 4 is an enlarged scrap view of part of FIG. 2.

Referring to FIG. 2 the suspension tower 1 has its upper portion turned inwardly at 12 and is provided adjacent its inner marginal edge with three equi-angularly spaced holes which receive respective bolts 13. These hold the assembly in place against the underside of the tower 1. A clamping ring 14 on the outside of the assembly has stepped inner rim 20, shown clearly in FIG. 4, which provides one of two inter-engaging circular surfaces, referenced 21 in FIG. 4. The second circular surface, referenced 22, is provided by the peripheral portion of an outwardly-turned flange 24 having a circular rim and formed at the upper end of an inverted frusto-conical rigid bush-holder 17, shown in FIG. 2. The thickness of the flange 24 is greater than the height of the step formed in the inside rim of the clamping ring 14 so that, when the bolts 13 are tightened, the flange 24 is tightly gripped between the ring 14 and the underside of the tower 1. When the bolts 13 are loosened, as shown in FIG. 4, the flange 24 can be rotated in the stepped portion of the rim 20.

As shown in FIGS. 2 and 3, the frusto-conical bush-holder 17 is eccentrically mounted with respect to the circular rim of the flange 24. A rubber bush 18, which is resiliently deformable and has shock-absorbing properties, has its outside surface bonded to the inside face of the holder 17. The inside surface of the bush 18 is cylindrical and bonded to the outside of a rigid sleeve 19 having its lower marginal edge turned inwardly at 100 to provide a base.

An annular, rigid, eccentric 33 having an inwardly turned annular lip 31 rests on the base 100 and has an outer race 38 of a thrust bearing 32 force-fitted into it. The angular position of the eccentric 33 in the sleeve 19 is controlled by a superimposed guard ring 34 connected by steel dowel pins 39 to the eccentric 33 beneath. The upper inner marginal portion of the guard ring 34 is formed with angularly spaced holes 35 arranged opposite one another and which enable a tool to be inserted into the sleeve 19 to engage spaced pins on the tool (not shown) with corresponding holes 35 in the guard ring 34.

The upper inside surface of the sleeve 19 is threaded to co-operate with external threads provided on a locking ring 45 which is screwed down the sleeve 19 to engage the upper surface of the guard ring 34. A set of circumferentially-spaced bores 41 in the locking ring 45 enable it to be tightened or loosened with respect to the guard ring 34. When the locking ring 45 is loose, the tool for altering the angular position of the eccentric 33 can be applied to the guard ring 34 to change the position of the thrust bearing 32 along a circular path.

FIG. 2 shows the upper or piston-rod end of a MacPherson strut 47 having a threaded spindle 48 which passes through the centre of the thrust bearing 32 and is held in position by a locking nut 49.

OPERATION OF THE FIRST EMBODIMENT

When manufactured, the MacPherson strut 47 of the vehicle has its longitudinal axis upright and at a designed angle. Through wear or damage, the angle can alter and the strut 47 is then misaligned. The thrust-bearing support assembly is adjustable to reposition the upper end of the MacPherson strut 47 to restore the correct alignment, as follows.

The bolts 13 are first slackened and the flange 24 manually rotated to correct the misalignment as far as possible. As the correction is effected by movement of the bush 18 along a circular path, the correction of an error in camber may introduce an error in castor, and vice-versa. This is subsequently corrected as explained below. The bolts 13 are then tightened to lock the circular support surfaces 21 and 22 of FIG. 4 together.

The locking ring 45 is next loosened and the tool is applied to rotate the eccentric 33 in a direction which corrects any castor or camber error still present. The locking ring 45 is then tightened when the strut 47 is once again at the correct angle.

SECOND EMBODIMENT

In the first embodiment the two sets of circular bearing surfaces which enable adjustment to be carried out are respectively located inside and outside the rubber bush. However in some circumstances both sets of circular bearing surfaces may be located outside the bush which then has the thrust-support bearing mounted coaxially in its centre as is shown in FIG. 5.

Figure 5:
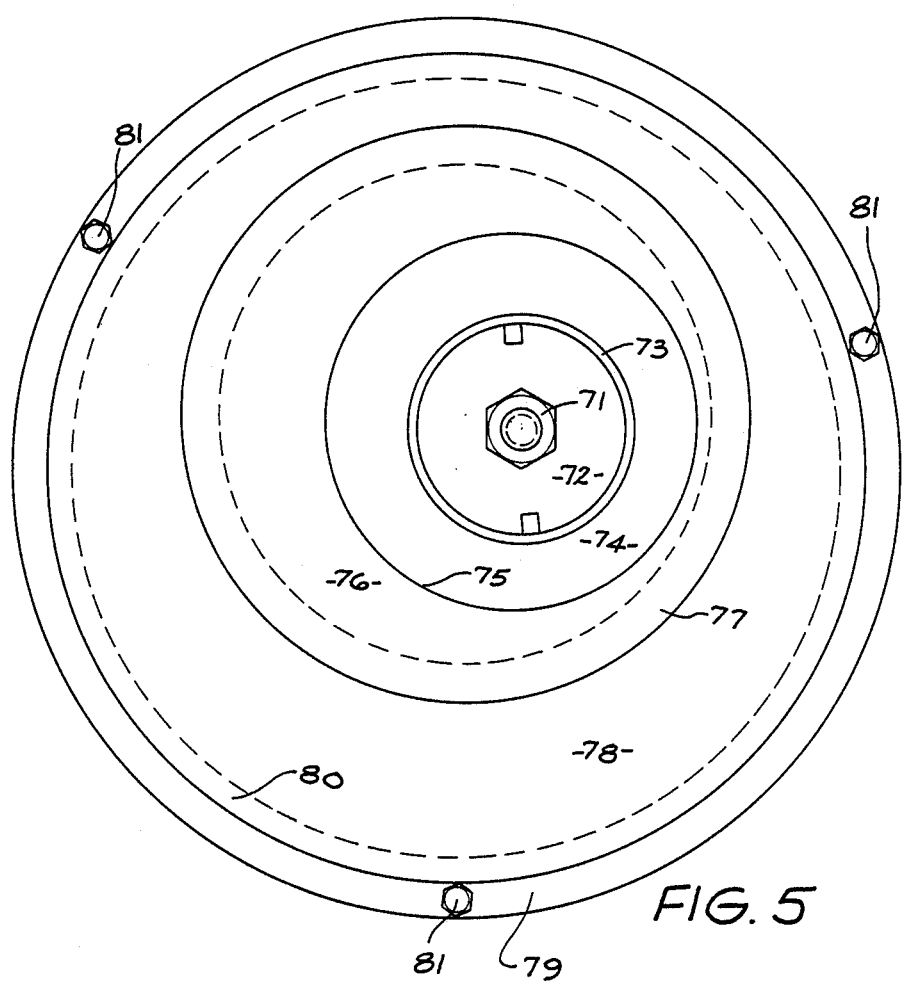
FIG. 5 is a plan view of a second embodiment of assembly.

In FIG. 5 the support assembly located the upper end of a MacPherson strut having an axial extension in the form of a threaded spindle onto which is screwed a nut 71. The spindle passes through a thrust-bearing 72 located concentrically inside a steel sleeve 73. The outside of the sleeve 73 is bonded to the inside surface of an annular rubber bush 74 made of a resiliently-deformable material having shock-absorbing properties. The outside surface of the bush 74 is bonded to the inside surface of a steel bush-holder 75 of circular cross-section and having a flange 76 projecting radially from its upper end. The rim of the flange is circular and is eccentric with respect to the axis of the thrust-bearing, as shown.

The marginal portion of the rim of the flange 76 provides one of two inter-engaging circular surfaces in overlapping relationship as indicated by the annular region 77. The other circular surface is provided by the inner rim of an eccentric flat ring 78 which, at its outer marginal edge, rests on a stepped inside rim of a clamping ring 79 similar to that described with reference to earlier figures. The annular region 80 shows where the circular surfaces of the rings 78 and 79 inter-engage by overlapping one another. Bolts 81 hold the assembly in position and, when released, permit the ring 78 to be rotated with respect to the ring 79. Clamping pieces (not shown but also operated by bolts) overlap the shaded circle 77 and are releasable to permit the flange 76 to be rotated with respect to the ring 78. Tightening the bolts of the clamping pieces locks the flange 76 and ring 78 together so that relative rotation cannot occur between them. As the thrust-bearing 72 is mounted eccentrically with respect to the axes of the two shaded circles 77 and 80, and the pairs of circular interengaging surfaces of each pair are separately operable, the two pairs enable correction to be applied to the position of the strut for an error in castor as well as for an error in camber, as has already been explained with respect to the first embodiment.

The clamping pieces referred to above and not shown, can be of any type. For example, they may comprise radial fingers held by releasable bolts to the ring 78 and extending radially inwards to overlap the upper surface of the flange 76 located in the shaded circle 77. A ring of radially-extending teeth can be provided on the flange 76 beneath the position of the fingers and these can be provided with complementary shaped teeth. When the bolts are tightened, the teeth on the finger pieces engage the teeth on the flange 76 and prevent its rotation with respect to the ring 78.

A disadvantage of such an arrangement is that the clamping pieces are necessarily close to the clamping ring 79 and the limitations on the available space make it hard to produce a cheap and easily adjustable design of thrust-support bearing assembly with such a configuration.

THIRD EMBODIMENT

Figure 6:
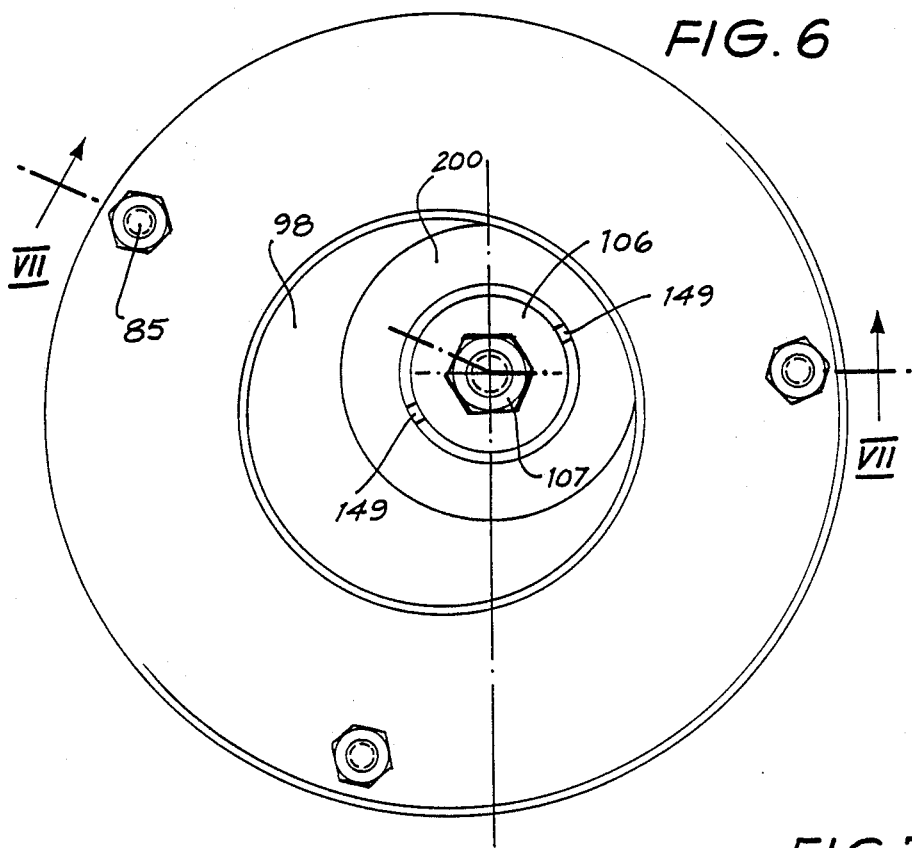
FIG. 6 is a plan view of a third embodiment of assembly.
Figure 7:
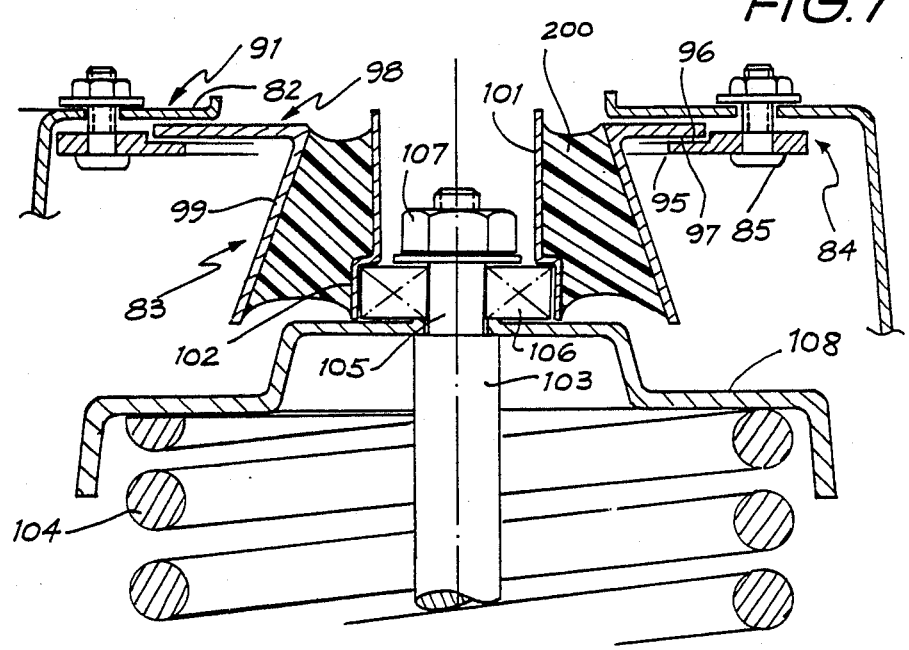
FIG. 7 is a vertical section through FIG. 6 taken on the angled line and in the direction indicated by the arrows VII—VII in that figure.

FIGS. 6 and 7 show a thrust bearing support assembly having a single set of circular inter-engaging surfaces.

Referring jointly to FIGS. 6 and 7, a suspension tower 91 of a vehicle wheel arch has its upper end turned in at 82 to provide a support surface for the bearing assembly shown at 83. The assembly 83 is held in position by a clamping ring 84 secured by bolts 85 to the underside of the support surface 82.

The inner rim of the clamping ring 84 is stepped at 95 to provide one of two circular, inter-engaging bearing surfaces 96 and 97. The bearing surface 97 is formed by an eccentric steel radial flange 98 formed at the upper end of an inverted frusto-conical bush holder 99. The inside surface of the holder 99 is bonded to the outside surface of an annular rubber bush 200 which resiliently deformable and has shock-absorbing properties. The bush 200 is lined with a steel sleeve 101 bonded to its inside surface and having an enlarged lower end 102.

A piston-rod end of a MacPherson strut 103 is surrounded by a coil-compression spring 104, and has its upper end 105 of reduced diameter. A thrust bearing 106 has its inside race seated on the end 105 and is held in position by a top nut 107 screwed onto the top of the portion 105. The outer race of the bearing 106 is press-fitted into the enlarged portion 102 of the sleeve 101.

A cap 108 encloses the upper end of the spring 104 and transfers its upward thrust to the underside of the bearing 106.

The frusto-conical holder 99 is coaxial with the bush 200 and the thrust bearing 106 (which may comprise a simple journal sleeve) but is eccentric with respect to the axis of the circular rim of the flange 98. Thus, once the bolts 85 are slackened, the holder 99 can be turned to move the axis of the upper end of the strut 103 around a circular path to restore the strut's alignment to a correct angle. The bolts 85 can then be tightened.

Rotation of the holder 99 is conveniently effected by providing the upper end rim of the sleeve 101 with vertical slots 149. A tool having a pair of diametrically spaced blades (not shown) can be fitted from above to the sleeve 101 so that the blades enter the slots 149. Turning the tool will then turn the assembly 83 within the stepped clamping ring 84.

DESCRIPTION OF FOURTH EMBODIMENT

Figure 8:
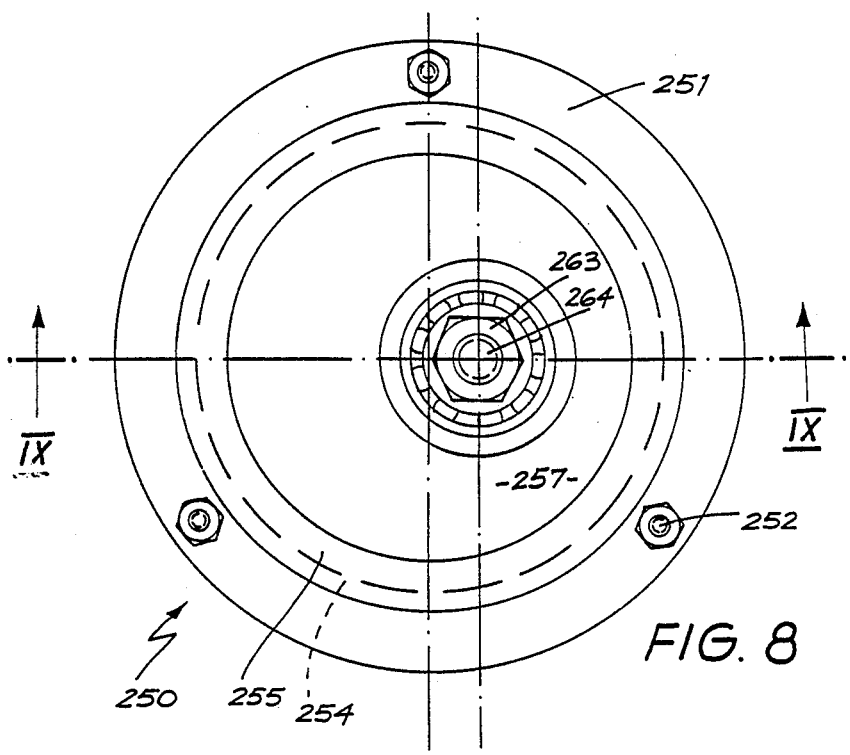
FIG. 8 is a plan view of a fourth embodiment of assembly.
Figure 9:
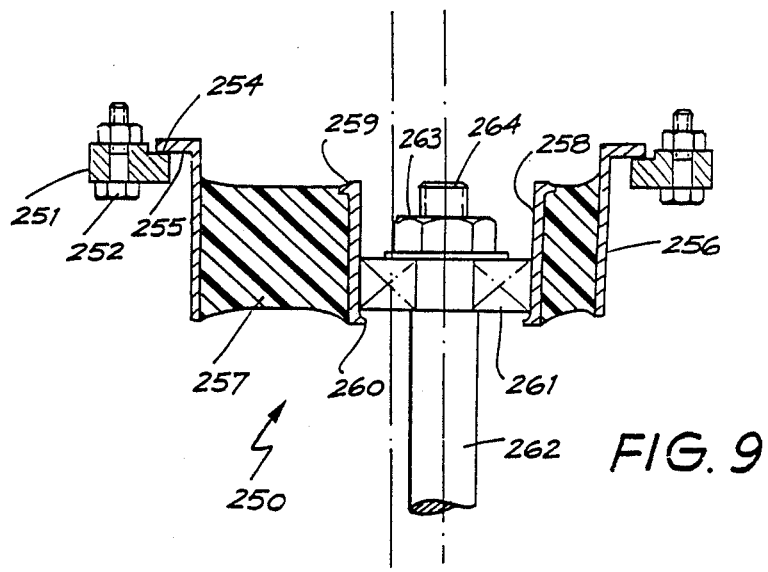
FIG. 9 is a vertical section through the assembly of FIG. 8 taken on the line and in the direction indicated by the arrows IX—IX in FIG. 8.

FIGS. 8 and 9 shown in simplified form an embodiment of the invention in which a thrust bearing support assembly 250 is held in place in the underside of a suspension tower (not shown) by an external clamping ring 251 having the same stepped configuration as the clamping rings referred to in connection with earlier described embodiments. The tightness of the clamping ring 251 is again varied by bolts 252 as with earlier figures.

A set of circular inter-engaging bearing surfaces 254 and 255 are respectively formed on the stepped portion of the inside rim of the clamping ring 251, and on the underside of a steel flange 255 arranged symmetrically around the upper end of a cylindrical bush holder 256.

The inside of the holder is bonded to the outside of an eccentric rubber bush 257 which is resiliently deformable and shock-absorbing. The bush has an eccentrically-arranged opening lined with a cylindrical steel sleeve 258 having an outwardly-turned upper end 259, and an inwardly turned lower end 260. The sleeve 258 holds in place a thrust bearing 261 encircling the upper, piston-end of a strut 262, which may be a MacPherson strut. A nut 263 screwed onto an axial, externally-threaded spindle 264 of the strut retains its upper end in the bearing 261.

The thrust-support bearing assembly of FIGS. 8 and 9 is adjusted in the same way as the assembly of FIGS. 6 and 7. However it is the eccentricity of the bush 257, rather than the flange 255, which produces the circular movement of the upper end of the strut 262 to locate it in a better position.

It will be observed that in all of the above embodiments, the position of the upper end of the MacPherson or other suspension strut is varied without having to reposition or remove the bearing assembly from the suspension tower, and without having to physically weaken parts of the assembly. Although the first and second embodiments of the invention give a finer degree of control over the position of the upper end of the strut than the embodiments of FIGS. 6 to 9, this degree of control is not essential and for many vehicles that provided by the third and fourth embodiments of the invention is quite sufficient.

We claim:

1. A thrust-support assembly for mounting the upper end of a MacPherson strut in a vehicle wheel-suspension system, comprising a thrust bearing for fitting to the upper end of the strut; an inner rigid annular member supporting the thrust-bearing; an outer rigid annular member spaced radially outwardly of the inner member and having means for mounting the assembly against the underside of a suspension tower of the vehicle; a resiliently-deformable annular bush having shock-absorbing properties and located between the inner and outer rigid members; a first pair of inter-engaging circular surfaces arranged eccentrically with respect the thrust-bearing axis and lying between the inner and outer members; and, first clamping means tightenable to prevent relative movement between the circular surfaces of the first pair, and loosenable to allow the two surfaces to be rotated with respect to one another so as to bring the thrust-bearing to a new position with respect to the rigid outer member.

2. An assembly as set forth in claim 1, including a second pair of inter-engaging circular surfaces spaced radially from the first pair and arranged eccentrically with respect to the thrust-bearing axis; and, second clamping means associated with the second pair of circular surfaces and selectively operable independently of the first clamping means to clamp them together, and to loosen them to enable one of the second pair to be rotated with respect to the other.

3. An assembly as claimed in claim 2, in which the two pairs of circular surfaces are respectively arranged inside and outside the bush.

4. An assembly as claimed in claim 3, in which the first pair of inter-engaging surfaces comprises two overlapping flat circular portions of two rings the outer of which is formed by a stepped inner marginal rim portion of the outer member, and the inner of the two rings rests on the outer ring and has its upper surface extending above the upper surface of the outer ring.

5. A support assembly for mounting the upper end of a MacPherson strut of a vehicle wheel-suspension system, comprising: a thrust bearing for fitting to the upper end of the strut; an inner rigid annular member supporting the thrust-bearing; an outer rigid annular member spaced radially outwards of the inner member and having a set of equiangularly-spaced holes through which bolts outwardly pass to secure the assembly to the underside of the upper end of a vehicle suspension tower; a resiliently deformable annular bush having shock-absorbing properties and located between the inner and outer rigid members; a pair of inter-engaging circular surfaces co-operating with one another to transmit vertical thrusts from the thrust-bearing radially outwards to the outer member, said circular surfaces being arranged eccentrically with respect to the thrust-bearing axis; and, clamping means associated with the pair of inter-engaging circular surfaces are loosenable to permit relative movement between them to re-locate the thrust-bearing axis around a circular path, the clamping means being tightenable after such re-location to hold the thrust-bearing in its new chosen position so that the inter-engaging surfaces can transmit the vertical thrusts on the bearing to the suspension tower.

6. An assembly as claimed in claim 5, in which the outer rigid member is provided radially inwardly of the bolt holes with a stepped inner rim providing a circular flat shelf forming one the circular surfaces, the other circular surface resting on the rim and being formed by a peripheral portion of a radially outwardly extending flange provided on a bush-holder of circular cross-section.

7. An assembly as claimed in claim 6, in which the bush provides an eccentric.

8. An assembly as claimed in claim 5, in which the bush is of symmetrically annular cross-section and has the thrust-bearing mounted centrally within it, and a rigid bush-holder of circular cross-section is formed with an eccentric flange having a circular rim portion providing the inner of a pair of circular surfaces and resting on a stepped inner rim of the outer member.

9. An assembly as claimed in claim 6, including a second pair of independently adjustable circular surfaces spaced radially inwardly of the first pair and having separately-operable clamping means.

* * * * *